No. 689,751. Patented Dec. 24, 1901.
J. A. ROBERTSON.
PHOTOGRAPHIC ROLL HOLDER.
(Application filed Feb. 1, 1901.)
(No Model.) 2 Sheets—Sheet 2.
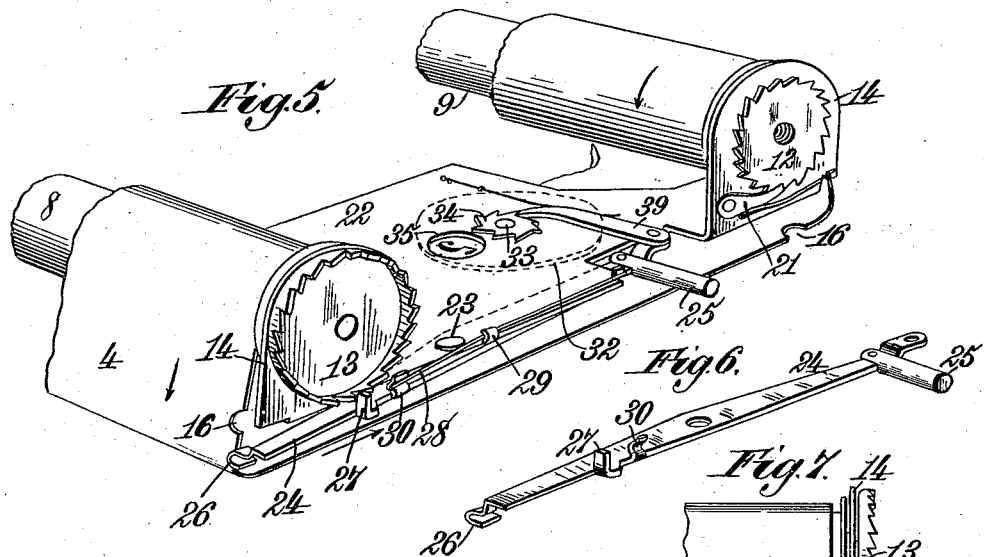
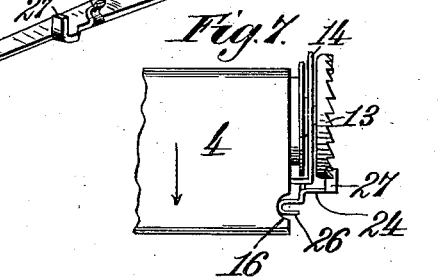
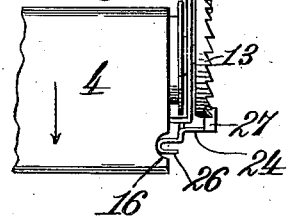
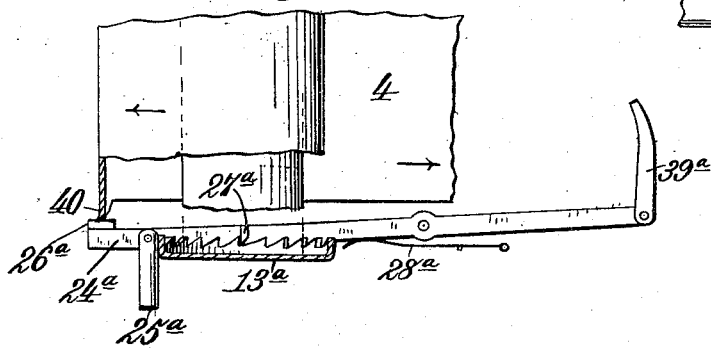
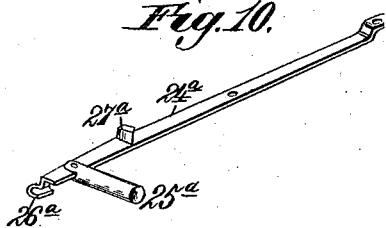
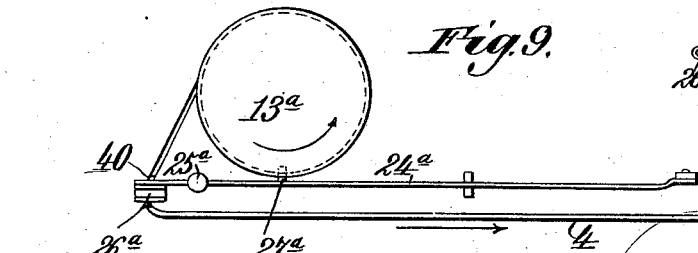
Witnesses.
Inventor,
John A. Robertson.
By James L. Norris
Att'y.

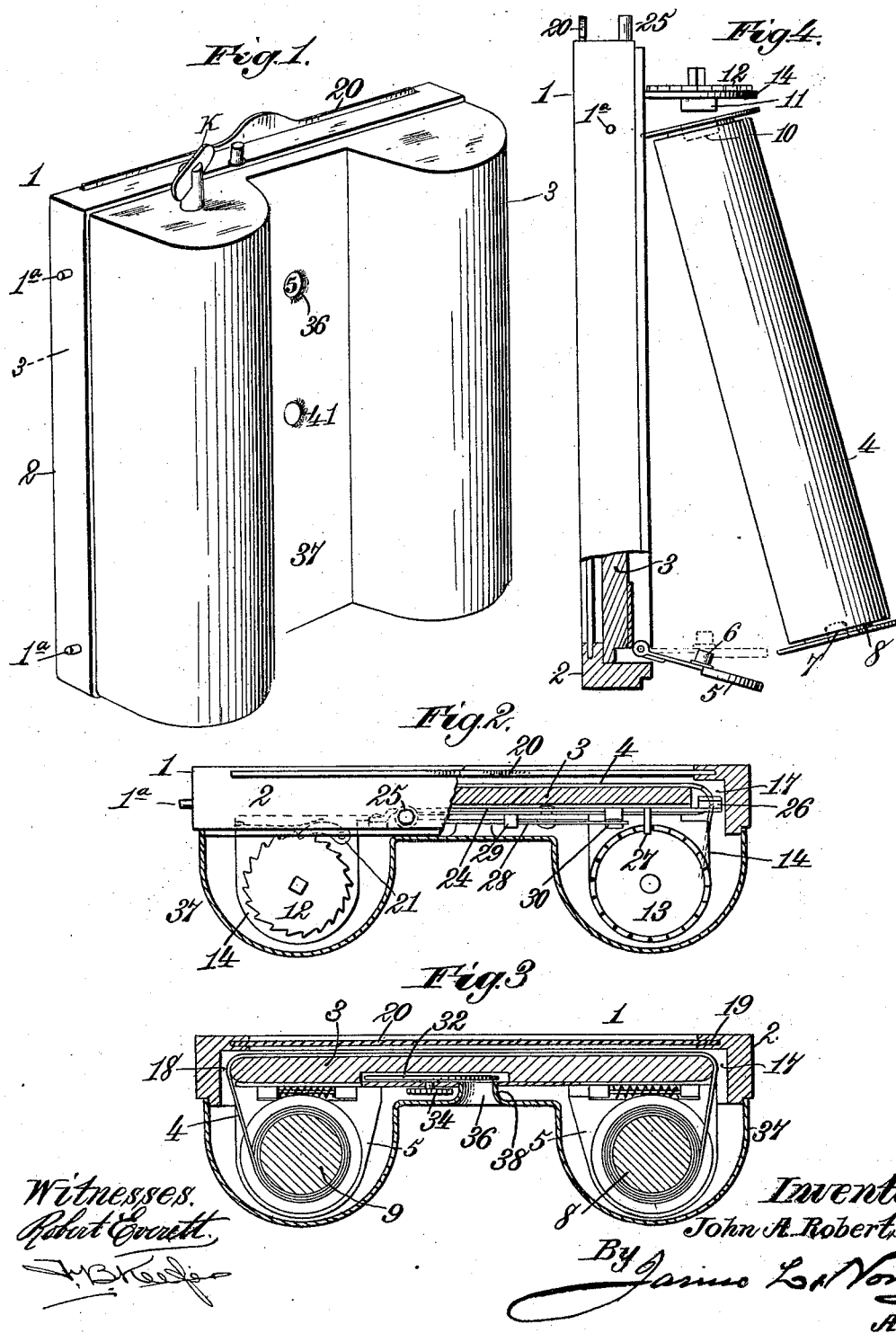

UNITED STATES PATENT OFFICE.

JOHN A. ROBERTSON, OF ROCHESTER, NEW YORK, ASSIGNOR TO HARVEY B. CARLTON, OF ROCHESTER, NEW YORK.

PHOTOGRAPHIC-ROLL HOLDER.

SPECIFICATION forming part of Letters Patent No. 689,751, dated December 24, 1901.

Application filed February 1, 1901. Serial No. 45,643. (No model.)

*To all whom it may concern:*

Be it known that I, JOHN A. ROBERTSON, a citizen of the United States, residing at Rochester, in the county of Monroe and State of New York, have invented new and useful Improvements in Photographic-Roll Holders, of which the following is a specification.

My invention relates to improvements in mechanism for regulating or controlling the presentation for exposure of a measured or determined quantity of surface of a sensitized film carried by a spool upon which it is wound and from which it is to be unwound and after exposure wound upon a take-up roll.

The invention is exhibited in this application embodied in a roll-holder for cameras adapted to be secured to the camera-box—as, for instance, a dry-plate camera-box—in any usual or known manner; but it will be understood that the invention may be equally embodied with the box or case of a film-camera.

My invention has for its object to provide mechanism coöperating with the film to automatically lock the film-spool from rotation at intervals, whereby a measured quantity, but no more, of the film may be withdrawn from the spool and presented for exposure.

The invention has for its object also to provide an indicator for indicating the number of exposures or negative-surfaces which have been unwound from the film-spool and which is operated automatically by the same movement which releases the film from the influence of the controlling mechanism.

My invention affords a means whereby a special tension device such as has been heretofore usual in the operation of exposing a continuous film is dispensed with and a positive automatic stopping or locking of the film-spool effected when the requisite measure of film has been unwound therefrom, thus insuring the presentation accurately for exposure of the proper measure of film-surface and locking the further unwinding of the film until the latter has been released from the controlling mechanism by the positive act of the operator.

To the attainment of the objects stated the invention consists in the novel combination, arrangement, and operation of parts hereinafter set forth, reference being made to the accompanying drawings, illustrating my invention. That which I regard as new will be set forth in the claims following the specification.

In the drawings, Figure 1 is a perspective view of the roll-holder; Fig. 2, a sectional plan view; Fig. 3, a section on the line 3 3 of Fig. 1; Fig. 4, a detail view illustrating the manner of mounting the film-spool and take-up roll. Fig. 5 is a perspective view of the stop mechanism, showing the same out of operation; Fig. 6, a detail of the lever and the parts carried thereby. Fig. 7 is an end detail view showing the relative position of the parts when the stop mechanism has acted and locks the film-spool from rotation. Figs. 8, 9, and 10 are details of a modified arrangement of stop mechanism.

Referring to the drawings, the numeral 1 indicates a roll-holder for cameras consisting of a base 2, which is adapted by any usual or known means, such as the pins $1^a$ or otherwise, to be connected to the camera box or case. It is provided with a film-plane 3, which lies across the exposing-chamber of the camera and in front of which the film 4 passes in being presented for exposure and exposed. At the rear of the film-plane are arranged the means for mounting the film-spool and take-up roll, which preferably consist of a pair of spring-hinged standards 5, arranged at the lower end of the film-plane and at the opposite side edges thereof, and these standards are provided with stud-journals 6, that fit into axial sockets 7 of the film-carriers, of which 8 is the film-spool and 9 the take-up roll. The opposite ends of said spool and roll are provided with lug-recesses 10, which receive angular lugs 11, projecting from ratchet-wheels 12 and 13, rotatably mounted in stationary standards 14, and thus the film-spool and take-up roll are supported and properly centered for rotation and true feed of the sensitized film. The film 4 is provided at intervals along one of its longitudinal edges with recesses 16, which I term "stop-assisters," the same being arranged at equal distances apart and serving to mark out the line of division between the consecutive exposures of negative surface, as well as to coöperate with the controlling mechanism, to prevent rotation of the film-spool after the requisite quantity of film has been unwound in the manner hereinafter described. The film is wound upon the spool when introduced into the roll-holder, and after having been mounted in the standards, as set forth, it is passed through the slot 17 at one side of the film-plane 3, across the face of and in front of said plane, through a slot 18 at the other side of said support, and then connected with the take-up roll in any suitable or known manner. The film is now ready to be unwound from the film-spool onto the take-up roll in regulated or measured quantities of surface, according to the dimensions of the negative or intervals between the stop-assisters 16, by means of a suitable key K engaging the take-up roll. The spring-hinged standards 5 permit their studs to be readily withdrawn from the sockets of the film-spool and take-up roll, so that new ones may be substituted when necessary.

The base of the roll-holder is provided with a slideway 19 in front of the film-plane in which, if desired, an exposing or dark slide 20 may be received.

The ratchet-wheel 12 of the take-up roll is engaged by a spring-pressed pawl 21, carried by the standard, whereby take-up rotation of the roll is permitted, but rotation in an opposite direction is prevented.

My invention resides in means for regulating or controlling the unwinding presentation for exposure of certain definite or measured quantities of film-surface and automatically locking one of the film-carriers from rotation when such quantity has been unwound therefrom.

I have illustrated two specifically-different forms of such mechanism, the preferred one of which will now be described as applied in operative relation to the film-spool. The film-plane 3 is countersunk to provide a seat to accommodate the plate 22, which carries the moving parts of the regulating or controlling mechanism. To the plate is pivoted at a point intermediate its ends, as at 23, a lever 24, to which at one side of the pivot is connected a push-pin 25, that projects through the frame of the roll-holder base in convenient reach to be actuated by the photographer. The other end of said lever is provided or formed with a laterally-extending finger 26 and adjacent thereto with a dog 27, adapted to engage the teeth of the film-spool ratchet and prevent rotation thereof and through the medium of its angular lug preventing rotation of the film-spool also. The mechanism described is located at one side of the path traveled by the film, or, in other words, at one side of the path of film-travel. The dog of the lever normally tends to engage the teeth of the ratchet under the influence of a spring 28, one end of which bears against an abutment 29 on the plate 22 and the other end against a similar abutment 30 on the lever 24. The dog is held out of engagement with said ratchet to permit the rotation of the film-spool by the finger 26 riding upon the edge of the film, as shown in the drawings, and only enters into engagement therewith at intervals when in the passage of the film a stop-recess 16, formed in the film, comes opposite the finger, and at this point the finger enters the recess under the influence of the spring 28, permitting the dog to come into engagement with the teeth of the ratchet. When the dog is so in engagement with the ratchet, it will be apparent that the film-spool cannot be further rotated, and consequently further withdrawal of the film from the spool is prohibited until the engagement of the dog with the ratchet-wheel is released by the operator. The photographer is now enabled by rotating or partially rotating the take-up roll to take up any slack that may exist between the engaged stop-assister and said roll to present the negative or exposure-space taut and smooth for the exposure. When a given exposure-surface or negative is properly presented in front of the film-plane for exposure, the exposure accomplished, and it is desired to present a new surface for exposure, the engagement of the dog with the ratchet of the film-spool is released by pressing upon the push-pin 25. This action not only moves the dog out of engagement with the ratchet, but also the finger 26 out of the stop-assister recess in the film, and by turning the key of the take-up roll another measure of film may be drawn from the film-spool. The push-pin is held inward an instant until the recess has passed out of reach of the finger, and it is then released and the finger, under the influence of the lever-spring 28, bears upon the edge of the film as it is being unwound from the spool, permitting another measured quantity thereof, determined by the position of the next stop-assister recess, to be presented for exposure, whereupon the lever-spring forces the finger to enter the recess and the pawl to engage with the film-spool ratchet, preventing its further rotation, as before described. In this preferred form of my invention an indicator-disk 32 is arranged in the undercut of the film-plane 3 and is fixedly mounted upon an axle 33, projecting through the plate 22, a ratchet 34 being fixed upon said axle on the opposite side of the plate. The indicator-disk is provided with a series of numerals which are visible through a sight-hole 35 in the plate, with which a corresponding sight-hole 36, formed in the cover 37 of the roll-holder, registers. The sight-hole in the cover is formed by drawing in the material of the cover, which preferably is of metal, the outstanding rim 38 of said sight-hole projecting into the sight-hole of the plate for the purpose of preventing possibility of entrance of light into the interior of the roll-holder. The indicator-disk is rotated periodically by means of a spring-pressed arm 39, carried by the lever 24, which acts upon the teeth of the indicator-ratchet when the push-pin is operated to release the film-spool from the engagement of the dog. The photographer may inform himself of the number of exposures made or of the exhaustion of the film by observing the indicator-disk through the registering sight-holes.

In the modified form of my invention, (illustrated in Figs. 8, 9, and 10 of the drawings,) and which is adapted for coöperation with a film the stop-assisters of which are in the form of projections 40 on the edge of the film, the film-spool ratchet 13$^a$ has its teeth projecting in the opposite direction from that in which the teeth of the ratchet 13 in the previously-described arrangement project. The lever 24$^a$ is pivoted to the plate 22, the finger 26$^a$ at one end normally riding on the edge of the film, with the dog 27$^a$ out of engagement with the teeth under the influence of spring 28$^a$. In the unwinding of the film in this arrangement when the said assister projection 40 arrives at the finger the latter will ride out on the cam-face thereof and in such movement throw the dog 27$^a$ into engagement with the ratchet-wheel teeth, locking the film-spool and preventing further unwinding of the film, as heretofore explained. To release the dog from the film-spool ratchet, the push-pin 25$^a$ is moved to withdraw the dog from the teeth of the ratchet, pushing the stop-assister projection aside. The parts being held momentarily in this position with the film-spool free to rotate, the film can be unwound until the projection 40 has passed the finger, whereupon the operating push-pin is released and the parts assume their former position with the finger riding on the edge of the film and a new surface is unwound and presented for exposure, the unwinding being limited by the finger meeting the succeeding arrester projection. This operation is repeated after each exposure until the film is exhausted. In this form of my invention the indicator mechanism is the same as that described hereinbefore and is operated by means of an arm 39$^a$, connected with the lever 24$^a$ at the end opposite the finger 26$^a$. Each time the said finger rides out upon the projection 40 the opposite end thereof is oscillated inward and the arm 39$^a$ moves the ratchet 34 one tooth, and consequently the indicator-disk, as hereinbefore described.

In either form of my invention, if it is desired, the indicating mechanism may be omitted, in which event the film would be provided with indications on its back or unsensitized face, which indications would be viewed through registering peep-holes 41 in the film-plane and roll-holder cover, the latter holes taking the place of the sight-openings 36.

My improved locking means while shown in the drawings as applied to engage with the film-delivery spool may be applied to the take-up or winding-up roll without modification of such means and by merely reversing the position of the parts. I do not, therefore, wish to confine my invention to the locking means applied to engage the film-delivery spool, except where in the following claims it is specifically described as engaging such film-delivery spool.

Having thus described my invention, what I claim is—

1. The combination with a film-carrier, of locking means therefor located at one side of the path of film travel and arranged and adapted to ride along and bear against the edge of the film, substantially as described.

2. The combination with a film-carrier, of locking means therefor located at one side of the path of film travel, and arranged and adapted to ride on the edge of the film and to coöperate with stop-assisters with which the edge of the film is provided, substantially as described.

3. The combination with a film-carrier, of spring-pressed locking means therefor located at one side of the path of film travel and arranged and adapted to ride on the edge of the film and to enter stop-assister recesses in the edge of the film, substantially as described.

4. A means for arresting and locking the movement of a photographic film, located at one side of the film travel and comprising a lever provided with a finger to ride along the edge of the film and engage stop-assisters with which the film is provided, and provided also with means for engaging a film-carrier and locking it from rotation, substantially as described.

5. A means for arresting the movement of a photographic film located at one side of the film travel and comprising a lever provided with a finger adapted to ride along the edge of the film and engage stop-assisters with which the film is provided, and a dog to engage a film-carrier, substantially as described.

6. A means for arresting and locking the movement of a photographic film, located at one side of the film travel and comprising a finger arranged and adapted to ride along the edge of the film and engage stop-assisters with which the latter is provided, and means for engaging a film-carrier and locking it from rotation, substantially as described.

7. The combination with a film-carrier adapted to contain a film provided with stop-assisters, means located at one side of the film travel arranged and adapted to ride along the edge of the film and engage the stop-assisters, and means actuated by said engagement for locking the film-carrier from rotation, substantially as described.

8. The combination with a film delivery-spool adapted to carry a film provided with stop-assisters, of means bearing against the edge of the film and coöperating with said stop-assisters to engage and lock the spool from rotation, substantially as described.

9. The combination with a film delivery-spool provided with a ratchet and adapted to carry a film having stop-assisters, of means bearing against the edge of the film and coöperating with said stop-assisters to engage the ratchet and lock the spool from rotation, substantially as described.

10. The combination with a film delivery-spool adapted to carry a film having stop-assisters, of means adapted to ride on the edge of the film for engaging said stop-assisters and spool and automatically locking the spool from rotation, substantially as described.

11. The combination with a film delivery-spool provided with a ratchet and adapted to carry a film having stop-assisters, of means bearing against the edge of the film for engaging said stop-assisters and said ratchet to lock the spool from rotation, substantially as described.

12. The combination with a film delivery-spool adapted to carry a film provided with stop-assisters, of means held out of engagement with the spool by the edge of the film and adapted to coöperate with said stop-assisters to engage and lock the spool from rotation, substantially as described.

13. The combination with a film delivery-spool provided with a ratchet and adapted to carry a film having stop-assisters, of means held out of engagement with the spool-ratchet by the edge of the film, and adapted to coöperate with the stop-assisters to engage the ratchet and lock the spool from rotation, substantially as described.

14. The combination with a film delivery-spool adapted to carry a film provided with stop-assisters, of a finger bearing against the edge of the film for engaging said stop-assisters, and a dog for engaging the spool when the finger is in engagement with one of the stop-assisters, whereby the rotation of the spool is stopped, substantially as described.

15. The combination with a film-carrier adapted to hold a film provided with stop-assisters, of a lever having a dog to engage said carrier and a finger to engage said stop-assisters, substantially as described.

16. The combination with a film-carrier provided with a ratchet and adapted to hold a film provided with stop-assisters, of a lever provided with a dog for engaging said ratchet and a finger for engaging said stop-assisters, substantially as described.

17. The combination with a film-carrier provided with a ratchet and adapted to hold a film provided with stop-assisters, and a spring-actuated lever provided with a dog for engaging said ratchet and a finger for engaging said stop-assisters, substantially as described.

18. The combination with a film-carrier provided with a ratchet and adapted to hold a film provided with stop-assisters, and a spring-actuated lever provided with a dog for engaging said ratchet and a finger for engaging said stop-assisters, and means for withdrawing said dog and finger from engagement with the ratchet and stop-assisters, substantially as described.

19. The combination with a film-carrier adapted to hold a film provided with stop-assisters, of a spring-actuated lever provided at one end with a device for engaging said carrier and a device for engaging said stop-assisters, and a push-pin at the opposite end of the lever for withdrawing said device from engagement, substantially as described.

20. The combination with a film-carrier provided with a ratchet, and adapted to hold a film having stop-assister recesses, of a spring-actuated lever provided with a finger for engaging the said recesses, and a dog for engaging the carrier-ratchet, said finger normally riding upon the edge of the film and holding the dog out of engagement with the ratchet and engaging said recesses at intervals to permit the dog to engage said ratchet under the influence of the spring and lock the spool from operation, substantially as described.

21. The combination with a film-carrier and a ratchet connected therewith, of a lever provided with a finger coöperating with the film and further provided with a dog adapted to engage said ratchet, substantially as and for the purpose described.

22. The lever provided with the finger and dog for coöperation with a photographic film and film-carrier and the arm for actuating indicating mechanism.

23. The combination with a film-carrier, and indicating mechanism, of a lever provided with a finger to coöperate with the film, a dog to engage the film-carrier, and an arm to actuate the indicating mechanism.

In testimony whereof I have hereunto set my hand in presence of two subscribing witnesses.

JOHN A. ROBERTSON.

Witnesses:
E. C. HASKIN,
H. B. CARLTON.